United States Patent Office 3,287,190
Patented Nov. 22, 1966

3,287,190
EXOTHERMIC COATED NITRATED CELLULOSE TAPE
Roger A. Long, Escondido, Calif., assignor to Whittaker, Corporation, Los Angeles, Calif., a corporation of California
No Drawing. Filed May 18, 1964, Ser. No. 368,346
18 Claims. (Cl. 149—12)

The present invention relates to an exothermic product and the process for producing this product. More particularly, the present invention is directed to an exothermic tape product which comprises a blend of exothermic reactants and a binder which product has highly consistent burning uniformity throughout and produces uniform heat quantity per square inch of area.

Exothermic reactants in the form of sheets or tapes have become increasingly useful in various processes as ignition sources and as controlled heat sources. For example, such exothermic materials are particularly useful as ignition sources and as heat sources in exothermic brazing processes. However, serious difficulties have been found in using such materials in processes where burning uniformity and heat quantity reliability are important because the prior art materials did not perform well in this regard.

Thus, it is a primary object of the present invention to provide an exothermic material which may be formed into a tape which has consistent burning uniformity and produces uniform quantities of heat per square inch of area and the process for producing this material.

It is another object of the present invention to provide an exothermic material which may be formed into tapes which comprises a blend of exothermic reactants and a binder and the process of producing this material.

Other objects and advantages of the present invention, it is believed, will be apparent from the following detailed description of preferred embodiments thereof.

Briefly, the process of the present invention comprises preparing a granular blend of the exothermic reactants, combining this blend with a binder, coating a substrate with the combination of exothermic reactants and binder, and drying the resultant product. In a preferred embodiment of the present invention, a granular exothermic reactant blend may be combined with a binder comprising a solution in ethyl acetate of nitrated cotton skrim cloth. After the binder and exothermic reactant have been formed into a slurry, this slurry is coated on a nitrated cotton skrim cloth substrate having any suitable dimension and the coated cloth is then dried. Preferably, the substrate is supported on a suitable fabric during the coating operation, Teflon coated fiberglass being preferred for use as the support.

The present invention is further illustrated by the following examples, but is not to be limited to the deails thereof. In these examples, all parts are by weight unless otherwise indicated.

*Example I*

An exothermic reactant composition comprising 24.9% magnesium, 52.3% nickel oxide and 22.8% manganese monoxide was prepared. Each of these materials was in granular form and had a particle size of —325 mesh (U.S. Standard Sieve). The manganese monoxide was dried overnight at a temperature of 180°–200° F. before blending. These materials were milled together in a ball mill under isopropyl alcohol using 00 neoprene rubber stoppers as the milling media. The composition was milled for 1.5 hours.

After milling had been completed, the contents were removed and the alcohol separated by evaporating to dryness. When all odor of alcohol had disappeared, the material was ready for dry blending.

The material was then dry blended on a ball mill using 00 neoprene rubber stoppers as the milling media. The dry blending proceeded for thirty minutes and all lumps were broken up. The binder was prepared by combining nitrated, chopped, cotton skrim cloth and 95–98% purified ethyl acetate. The procedure used to nitrate the skrim cloth will be described below. 45 grams of the skrim cloth were dissolved and/or dispersed in 1200 ml. ethyl acetate. The resulting product was apparently not a true solution since it had a tendency to settle.

The cotton skrim cloth was nitrated by subjecting pieces of this cloth approximately one yard square to a mixture of equal parts of nitric acid and sulfuric acid. Dry Ice was packed around the outside of the container holding the acid mixture to control the temperature of the solution. A temperature of —5 to 0° C. was maintained during the nitrating process. The nitrating was permitted to proceed for one and one-half hours. The cloth was agitated in the acid during this treatment. The cloth was then removed from the acid solution and excess acid was allowed to drain. The cloth was then neutralized by placing the skrim in a solution of sodium bicarbonate. After the foaming action had subsided, the skrim was removed and rinsed in distilled water. The skrim was then hung to dry in a stretched condition to prevent the formation of folds or heavy wrinkles. After the nitrated skrim had dried, pieces having dimensions of about 5″ x 28″ were prepared. Extreme care must be used when handling the dry nitrated skrim since it is gun cotton. The nitrated skrim used to prepare the binder was prepared in the same manner.

A slurry comprising 250 grams of the blend of exothermic reactants and 100 ml. of the binder was then prepared. The binder was agitated for a very short period before it was combined with the exothermic reactants. The slurry was then milled on a ball mill for about thirty minutes.

Support members comprising pieces of Teflon coated fiberglass having a thickness of 0.005 inch and cut into strips four inches wider and eight inches longer than the nitrated skrim strips were prepared. One end of a piece of skrim was secured to the fiberglass support with an adhesive tape after the skrim had been centered on the support.

The support with the skrim attached thereto was then pulled under the doctor blade of a coater until the adhesive tape holding the skrim was under the blade. A light roller was placed approximately four inches behind the blade to keep the skrim flat and allowed to feed evenly and smoothly. The slurry was then allowed to flow onto the skrim between the blade and roller and the skrim was pulled under the blade at a rate of twelve inches per minute, allowing the slurry to ride over the edges of the skrim and onto the support. The clearance of the doctor blade was 0.033 inch and the skrim was found to have about 0.7 gram per square inch of material deposited thereon.

After the support had passed completedy through the coater, it was retained in a flat position and the coated skrim was allowed to dry completely. To prevent curling during drying, light pieces of wood were pressed gently on each side of the skrim. Upon complete drying, the skrim released itself from the support.

The resulting exothermic tape product was found to burn uniformly and to produce a uniform quantity of heat per square inch of area.

*Example II*

In this example, a binder comprising nitrated cotton was used. Sterile cotton sold under the name "Red Cross" was first nitrated in the manner described in Example III and then dissolved in the solvent having the following composition:

|  | Ml. |
|---|---|
| Acetone | 100 |
| Amyl acetate | 45 |
| Butyl acetate | 15 |
| Ethyl acetate | 15 |
| Dibutyl phthalate | 1.5 |

11.25 grams of nitrated cotton wet in 75 ml. of toluene was dissolved in 705 ml. of the solvent composition described above. Solution was promoted by a three minute agitation in a Waring Blender. The nitrated cotton was found to dissolve readily within two hours.

100 ml. of this binder was then combined with 250 grams of the exothermic reactant composition described in Example I in the manner described in Example I. The resulting slurry was then coated on a nitrated skrim cloth in the manner described in Example I. However, this skrim cloth was nitrated in the manner described in Example III. The coated skrim was then dried in the manner previously described. The resulting product was an exothermic tape which burned uniformly and produced a uniform quantity of heat per square inch of area.

*Example III*

An alternate nitrating process which may be used to nitrate the cotton or cotton skrim used in the present invention comprises the following steps. The material to be nitrated is first boiled in tap water for thirty minutes (this step is used only for skrim), the material is then rinsed in cold water for approximately two minutes and placed in a mixture comprising equal parts of nitric acid and sulfuric acid after the material has been allowed to dry. The acid mixture is held at a temperature of about 30–35° C. and the material is allowed to remain in the acid for about ten minutes. The material is then removed from the acid and rinsed in cold water until the pH reaches about 5.0. The material is then placed in a suction funnel and washed several times with distilled water. The material is then boiled for thirty minutes in distilled water, washed in a suction funnel with distilled water and allowed to partially dry by means of the suction. The drying is then completed by drying in air followed by room temperature vacuum drying for about two hours.

It is to be understood that the present invention is not limited to the specific exothermic reactants set forth in the examples, but is applicable to a wide variety of exothermic systems. For example, a system comprising 20% magnesium, 52% nickel oxide, 18% manganese monoxide, 4% aluminum and 6% manganese dioxide may be used. Another suitable system is that comprising 16–25% boron and 75–84% vanadium pentoxide ($V_2O_5$) with or without the addition of aluminum and alumina, an example of the former being 28% vanadium pentoxide, 9.4% boron, 26.5% manganese dioxide, 11% aluminum and 25% alumina ($Al_2O_3$). Still another system suitable for use in the present invention is that consisting of a mixture comprising 50% of 16.5% boron and 83.5% vanadium pentoxide with 50% of 33.3% aluminum and 66.7% vanadium pentoxide which has shown a fast burning time response, particularly in vacuum. Another system contemplated for use in the present invention comprises 22.2% aluminum, 6.6% magnesium, 46% titanium dioxide, 17.3% nickel oxide, 6.1% manganese monoxide and 1.8% manganese dioxide. Thus, it will be clear to those skilled in the art that the broad invention described herein is that directed to an exothermic tape comprising a nitrated cellulose substrate and a coating comprising granular exothermic reactants and a nitrated cellulose binder. Given the concept of the present invention, it is to be expected that exothermic systems other than those specifically described herein which are suitable for use in this invention will be developed by those skilled in the art. The exothermic system chosen for a particular use will depend upon the amount of heat which it is desired to generate, the temperature at which it is desired to generate this heat and other factors associated with the end use of the exothermic tape. However, it is also to be understood that the specific exothermic systems described herein in combination with the nitrated cellulose binder and nitrated cellulose substrate are also considered to be separate inventive contributions to the art. In this regard, exothermic systems comprising nickel oxide, manganese monoxide and magnesium are preferred for use in the present invention and the use of systems comprising these three constituents in the manner described herein is believed to be an inventive concept of substantial importance. The ingredients of this system may be combined in various proportions and additional ingredients may be added to the system in order to tailor the exothermic properties of the system to the specific end use for which the tape is intended.

Having fully described the present invention, it is to be understood that I am not to be limited to the specific details set forth, but my invention is of the full scope of the appended claims.

I claim:

1. A process for preparing an exothermic material comprising the steps of coating a substrate with a slurry comprising finely divided exothermic reactants and a nitrated cellulose binder, said substrate comprising nitrated cellulose, and drying said coating.

2. A process for preparing an exothermic material comprising the steps of coating a substrate with a slurry comprising finely divided exothermic reactants and a nitrated cellulose binder, said substrate comprising nitrated cellulose, the nitrated cellulose in said binder and said substrate having been prepared by contacting said cellulose with nitric acid at a temperature in the range of from —5° C. to about 35° C., and drying said coating.

3. An exothermic material comprising a nitrated cellulose substrate and a coating comprising granular exothermic reactants and a nitrated cellulose binder.

4. An exothermic material comprising a nitrated cellulose substrate and a coating comprising finely divided exothermic reactants and a nitrated cellulose binder, said exothermic reactants consisting essentially of 24.9% by weight magnesium, 52.3% by weight nickel oxide and 22.8% by weight manganese monoxide.

5. An exothermic material comprising a nitrated substrate and a coating comprising an exothermic system and a nitrated cellulose binder, said exothermic system comprising magnesium, nickel oxide and manganese monoxide combined in exothermic proportions.

6. An exothermic material comprising a nitrated cellulose substrate and a coating comprising finely divided exothermic reactants and a nitrated cellulose binder, said exothermic reactants consisting essentially of 20% by weight magnesium, 52% by weight nickel oxide, 18% by weight manganese monoxide, 4% aluminum and 6% manganese dioxide.

7. An exothermic material comprising a nitrated cellulose substrate and a coating comprising finely divided exothermic reactants and a nitrated cellulose binder, said exothermic reactants consisting essentially of 16–25% by weight boron and 75–84% by weight vanadium pentoxide.

8. An exothermic material comprising a nitrated cellulose substrate and a coating comprising finely divided exothermic reactants and a nitrated cellulose binder, said exothermic reactants consisting essentially of 28% by weight vanadium pentoxide, 9.4% by weight boron, 26.5% by weight manganese dioxide, 11% by weight aluminum and 25% by weight alumina.

9. An exothermic material comprising a nitrated cellulose substrate and a coating comprising finely divided exothermic reactants and a nitrated cellulose binder, said exothermic reactants consisting essentially of 22.2% by weight aluminum, 6.6% by weight magnesium, 46.0% by weight titanium dioxide, 17.3% by weight nickel oxide, 6.1% by weight manganese monoxide and 1.8% by weight manganese dioxide.

10. An exothermic material comprising a nitrated cellulose substrate and a coating comprising finely divided exothermic reactants and a nitrated cellulose binder, said exothermic reactants consisting essentially of 24.9% by weight magnesium, 52.3% by weight nickel oxide and 22.8% by weight manganese monoxide.

11. A process for preparing an exothermic material comprising the steps of coating a substrate with a slurry comprising finely divided exothermic reactants and a nitrated cellulose binder, said slurry having a composition corresponding to 250 grams of exothermic reactant per 100 ml. of binder, said substrate comprising nitrated cellulose, the nitrated cellulose in said binder and said substrate having been prepared by contacting said cellulose with nitric acid at a temperature in the range of from about $-5°$ C. to about $35°$ C., and drying said coating.

12. A process for preparing an exothermic material which comprises the steps of coating a substrate with a slurry comprising finely divided exothermic reactants which comprise 24.9% by weight magnesium, 52.3% by weight nickel oxide and 22.8% by weight manganese monoxide, said proportions being based on the total weight of exothermic reactants, and a nitrated cellulose binder, said substrate comprising nitrated cellulose, the nitrated cellulose in said binder and said substrate having been prepared by contacting said cellulose wtih nitric acid at a temperature in the range of from $-5°$ C. to about $35°$ C. and drying said coating.

13. The process for preparing an exothermic material comprising the steps of coating a substrate with a slurry comprising finely divided exothermic reactants which comprise magnesium, nickel oxide and manganese monoxide combined in exothermic proportions, and a nitrated cellulose binder, said substrate comprising nitrated cellulose, the nitrated cellulose in said binder and said substrate having been prepared by contacting said cellulose with nitric acid at a temperature in the range of from $-5°$ C. to about $35°$ C., and drying said coating.

14. A process for preparing an exothermic material comprising the steps of coating a substrate with a slurry comprising finely divided exothermic reactants which comprise 20% by weight magnesium, 52% by weight nickel oxide, 18% by weight manganese oxide, 4% by weight aluminum and 6% by weight manganese dioxide, and a nitrated cellulose binder, said substrate comprising nitrated cellulose, the nitrated cellulose in said binder and said substrate having been prepared by contacting said cellulose with nitric acid at a temperature in the range of $-5°$ C. to about $35°$ C., and drying said coating.

15. The process of preparing an exothermic material comprising the steps of coating a substrate with a slurry comprising finely divided exothermic reactants which comprise 16 to 25% boron and 75–84% vanadium pentoxide, and a nitrated cellulose binder, said substrate comprising nitrated cellulose, the nitrated cellulose in said binder and said substrate having been prepared by contacting said cellulose with nitric acid at a temperature in the range of from $-5°$ C. to about $35°$ C., and drying said coating.

16. A process for preparing an exothermic material comprising the steps of coating a substrate with a slurry comprising finely divided exothermic reactants which comprise 28% by weight vanadium pentoxide, 9.4% by weight boron, 26.5% by weight manganese dioxide, 11% by weight aluminum, and 25% by weight alumina, and a nitrated cellulose binder, said substrate comprising nitrated cellulose, the nitrated cellulose in said binder and said substrate having been prepared by contacting said cellulose with nitric acid at a temperature in the range of from $-5°$ C. to about $35°$ C., and drying said coating.

17. The process for preparing an exothermic material comprising the steps of coating a substrate with a slurry comprising finely divided exothermic reactants which comprise 22% by weight aluminum, 6.6% by weight magnesium, 46.0% by weight titanium dioxide, 17.3% by weight nickel oxide, 6.1% by weight manganese monoxide and 1.8% by weight manganese dioxide, and a nitrated cellulose binder, said substrate comprising nitrated cellulose, the nitrated cellulose in said binder and said substrate having been prepared by contacting said cellulose with nitric acid at a temperature in the range of from $-5°$ C. to about $35°$ C., and drying said coating.

18. A process for preparing an exothermic material comprising the steps of coating a substrate with a slurry comprising finely divided exothermic reactants which comprise a mixture, 50% of said mixture comprising 16.5% boron and 83.5% vanadium pentoxide, and 50% of said mixture comprising 33.3% aluminum, and 66.7% vanadium pentoxide, and a nitrated cellulose binder, said substrate comprising nitrated cellulose, the nitrated cellulose in said binder and said substrate having been prepared by contacting said cellulose with nitric acid at a temperature in the range of from $-5°$ C. to about $35°$ C., and drying said coating.

References Cited by the Examiner
UNITED STATES PATENTS

| | | | |
|---|---|---|---|
| 777,125 | 12/1904 | Muller-Jacobs | 149—96 X |
| 2,405,104 | 7/1946 | Mydans | 102—97 |
| 2,591,105 | 4/1952 | Strauss et al. | 149—2 X |
| 3,067,686 | 12/1962 | Coover et al. | 102—98 |
| 3,162,558 | 12/1964 | Bishop et al. | 149—2 |

BENJAMIN R. PADGETT, *Primary Examiner.*